United States Patent [19]

Eberle et al.

[11] Patent Number: 4,676,095
[45] Date of Patent: Jun. 30, 1987

[54] APPARATUS FOR MEASURING THE WORK PERFORMED BY A GAS COMPRESSOR

[75] Inventors: Arthur C. Eberle, Upper Arlington; David M. Thomson; John J. Sherman, both of Columbus, all of Ohio

[73] Assignee: Columbia Gas System Service Corp., Columbus, Ohio

[21] Appl. No.: 800,784

[22] Filed: Nov. 22, 1985

[51] Int. Cl.[4] .......................................... G01M 15/00
[52] U.S. Cl. ....................................................... 73/112
[58] Field of Search ............... 73/112, 862.28, 115, 73/168; 364/400; 340/679; 417/19, 63

[56] References Cited

U.S. PATENT DOCUMENTS

| | | | |
|---|---|---|---|
| 1,545,752 | 7/1925 | Freeman | 73/112 |
| 1,691,360 | 11/1928 | Reagan | 73/112 |
| 1,956,309 | 4/1934 | Borden | |
| 2,339,150 | 1/1944 | Codrington | |
| 2,826,068 | 3/1958 | Sperry | |
| 2,937,526 | 5/1960 | Roche | |
| 3,535,929 | 10/1970 | Mondeil et al. | |
| 3,640,131 | 2/1972 | Turk | |
| 3,665,399 | 5/1972 | Zehr et al. | 340/679 |
| 3,729,989 | 5/1973 | Little | 73/862.28 |
| 4,051,351 | 9/1977 | Mallick, Jr. et al. | 364/400 |
| 4,064,748 | 12/1977 | Leshner | |
| 4,339,749 | 7/1982 | Yamada | 340/679 |
| 4,584,654 | 4/1986 | Crane | 73/112 |

FOREIGN PATENT DOCUMENTS 48310 10/1983 Japan .................................. 73/862.28

OTHER PUBLICATIONS

ASME, Solar Powered Microprocessors: An Advance in Measurement Accuracy for Gas Producers, Dec. 10, 1981.
Daniel Industries, Inc. Solar Flow Bulletin No. 2411, Solar Flow Microprocessor-Based Low Power Flow Computer, 1981.
Daniel Industries, Inc. Bulletin No. 2412, Solarflow 2 Microprocessor-Based Gas Flow Computer for Turbine etc.

Primary Examiner—Stewart J. Levy
Assistant Examiner—Robert R. Raevis
Attorney, Agent, or Firm—Sidney W. Millard

[57] ABSTRACT

An apparatus for measuring the work produced by a compressor comprises pressure sensors for measuring the suction and discharge pressures of the compressor and a device for measuring the operating speed of the compressor. The apparatus further comprises a data processor for receiving signals representative of the suction and discharge pressures of the compressor and its operating speed, and generating a signal representative of the work performed by the compressor during a predetermined time interval. Desirably, the data processor is designed to integrate the work output of the compressor over a series of time intervals to generate a cumulative horsepower-hour reading for the compressor over an extended period of time.

6 Claims, 2 Drawing Figures

APPARATUS FOR MEASURING THE WORK PERFORMED BY A GAS COMPRESSOR

BACKGROUND OF THE INVENTION

This invention relates to an apparatus and process for measuring the work performed by a compressor.

Small compressors are widely used in the natural gas industry at production wells and storage facilities. Such compressors are used to increase the relatively low pressure of gas (1) emerging from natural gas wells, (2) leaving gas storage facilities or (3) being injected into storage wells, to the far higher pressures (usually of the order of Megapascals) which must be used in long-distance gas pipelines or for any other reason.

The compressor units used for this purpose conventionally contain a small gas engine, powered by natural gas bled from the supply being compressed, and a reciprocating compressor which performs the actual compression. The compressor units often operate unattended for protracted periods in remote locations and may run continuously or be started by timers, pressure switches or by remote control from a central control room. The gas consumption of the gas engines in such compressor units is substantial and it is desirable to determine periodically the efficiency at which such compressor units are operating in order to ensure that loss in efficiency of the compressor unit does not result in unnecessary consumption of the natural gas used as fuel.

To measure efficiency of the compressor unit, it is necessary to determine both the fuel consumption and the work performed by the compressor unit. Measurement of fuel consumption can readily be effected by conventional techniques known to those skilled in the art. However, hitherto no apparatus capable of measuring the work performed by the compressor unit and appropriate for long-term unattended use at remote locations, often without commercial power, such as those where many such compressor units are installed, have been available. Consequently, at present such compressor units are provided only with a revolution counter arranged to count the total number of engine revolutions of the compressor unit. Although such an engine revolution counter can in some cases give an indication of reduced efficiency of the compressor unit, in many cases an engine revolution counter may fail to detect loss of efficiency because the work performed by the compressor is not necessarily directly proportional to the engine revolutions. For example, if a compressor has bad valves, it can operate with a very low gas throughput, and reduction in gas throughput is not indicated by an engine revolution counter.

Accordingly, there is a need for an apparatus for measuring the work performed by a compressor, this apparatus being sufficiently small, economical and reliable to be suitable for installation on compressor sets used in natural gas production and storage facilities, and this invention provides such an apparatus.

SUMMARY OF THE INVENTION

This invention provides apparatus for measuring the work performed by a compressor, the apparatus comprising a first pressure sensor means for measuring the suction pressure of gas entering the compressor and generating a first signal representative of this suction pressure, a second pressure sensor means for measuring the discharge pressure of gas leaving the compressor and generating a second signal representative of the discharge pressure, an operating speed measuring means for generating a third signal representative of the operating speed of the compressor during a predetermined time interval, and a calculating means arranged to receive the first, second and third signals and to calculate therefrom a fourth signal representative of the work performed by the compressor during this predetermined time interval. This fourth signal is summed over time to indicate a running total of work done.

This invention also provides a process for measuring the work performed by a compressor, this process comprising generating a first signal representative of the suction pressure of gas entering the compressor, generating a second signal representative of the discharge pressure of gas leaving the compressor, generating a third signal representative of the operating speed of the compressor during a predetermined time interval, calculating, from the first, second and third signals, a fourth signal representative of the work performed by the compressor during the predetermined time interval, and recording the value of the fourth signal. The integral of work over time is then displayed for use as is appropriate.

DETAILED DESCRIPTION OF THE INVENTION

Figure 1:
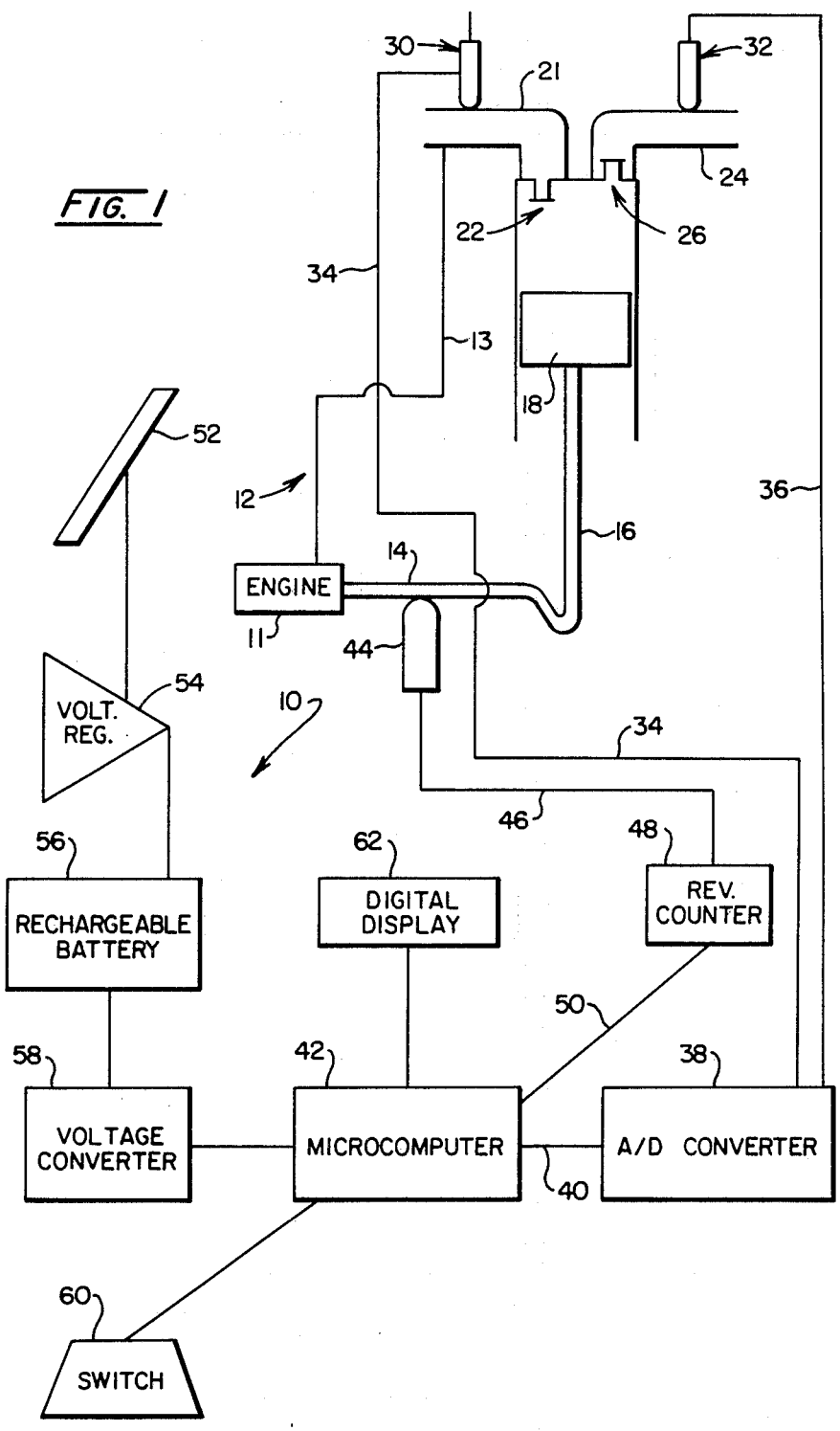
FIG. 1 is a schematic diagram showing an apparatus of the invention in use on a compressor set.

FIG. 1 shows schematically an apparatus of the invention, generally designated 10, being used in conjunction with a reciprocating compressor set, generally designated 12. A motor 11 is illustrated as being supplied with fuel from a line 13 connected to the same source as the gas to be compressed by the compressor set 12.

The construction of the compressor set 12 is conventional and will therefore only be described very briefly. The compressor set 12 comprises a crankshaft 14 rotated by the engine part of the compressor set. This crankshaft 14 is connected to a connecting rod 16, which is in turn connected to a piston 18 so that rotation of the crankshaft 14 causes the piston 18 to reciprocate within a cylinder 20. The cylinder is provided with an inlet line 21, connected to a source of gas (not shown), flow of gas from the inlet line 21 into the cylinder 20 being controlled by an inlet valve 22. The cylinder 20 is also provided with an outlet line 24, egress of gas from the cylinder 20 into the outlet line 24 being controlled by an outlet valve 26. As is conventional in the art, operation of the dish type valves 22 and 26 is controlled by pressure differentials so that gas is drawn from the inlet line 21 through the inlet valve 22 into the cylinder 20, there compressed by the piston 18 and the compressed gas allowed to flow out of the cylinder via the valve 26 into the outlet line 24 and thence to an appropriate outlet for compressed gas, e.g., a high pressure gas pipe line.

The apparatus 10 of the invention used in conjunction with the compressor set 12 comprises a first pressure sensor means or suction pressure sensor 30 fixed in the inlet line 21 so as to measure the suction pressure of gas entering the compressor. Appropriate pressure sensors for this purpose are well known to those skilled in the art and are readily available commercially. For example, the suction pressure sensor 30 may be a Model SA manufactured by Data Instruments. Such a sensor 30 generates a first analog signal representative of the suction pressure of the gas entering the compressor.

The apparatus 10 of the invention further comprises a second pressure sensor means or discharge pressure sensor 32 fixed in the outlet line 24 so as to measure the pressure in this line, which is the discharge pressure of gas leaving the compressor. The pressure sensor 32 generates a second analog signal representative of this discharge pressure.

The analog signals from the pressure sensors 30 and 32 are sent via lines 34 and 36 respectively to an analog to digital converter 38. The converter 38 converts the analog forms of the first and second signals generated by the pressure sensors 30 and 32 respectively to corresponding digital signals, which are then passed via a line 40 to a microcomputer 42. Although only two signals from the two pressure sensors thus have to be converted to digital form, we have found it convenient to use a four-channel analog to digital converter as the converter 38, since such a four-channel converter allows for further expansion of the system to provide an additional pair of pressure sensors, either to allow a single converter to operate with two separate compressor sets, or to allow for the use of additional suction and discharge pressure sensors, thereby allowing measurement of additional compressor stages. Appropriate 4-channel analog to digital converters are readily available commercially, for example, the converter 38 may be a ADCO844 converter manufactured by National Semiconductor Corporation.

The apparatus 10 further comprises an operating speed measuring means in the form of a magnetic pickup 44 disposed adjacent the crankshaft 14 in a manner which will be familiar to those skilled in the art, the magnetic pickup 44 is arranged, in conjunction with appropriate attachments to the crankshaft 14, to generate at least one pulse for each revolution of the crankshaft 14. The pulses produced by the magnetic pickup 44 are transmitted via a line 46 to a revolutions counter 48 which counts the pulses produced by the magnetic pickup 44 and maintains, in its electronic circuitry, a register containing the total number of revolutions undergone by the crankshaft 14. The revolutions counter 48 is connected via a line 50 to the microcomputer 42.

The microcomputer 42 acts as the central processing unit carrying out the logic functions of the apparatus 10. The microcomputer 42 comprises a single board microcomputer such as the commercially available RCA Type S600. This computer contains a microprocessor, digital input and output subsystems, a first ready-only memory in which is stored an interpreter program for converting a program written BASIC language to the machine code used by the microprocessor, a random access memory and a second, programmable read-only memory which contains certain constants of the compressor (these constants described in more detail below) and a working program, written in BASIC for calculating the value of a fourth signal representative of the work performed by the compressor during a predetermined time interval from the two digital pressure signals provided by the computer 38 and the signal representative of crankshaft revolutions provided by the counter 48.

The organization of the software used in microcomputer 42 is somewhat unusual. Inconventionally, when a single program is to be used in multiple copies in dedicated microcomputers for applications such as "intelligent" measuring instruments, a programmer writes the original operating program in a high-level language such as BASIC. This high-level language version of the operating program is then converted into an appropriate object code (machine language) version by means of an interpreter program; this conversion of the working program into object code is normally performed by a main-frame or other computer separate from dedicated microcomputer in which the program will eventually be run. Once the object code version of the operating program has been prepared, it is then copied, in multiple copies, into a series of dedicated microcomputers.

In contrast, in the preferred embodiment of the apparatus of the present invention shown in the accompanying drawings, a BASIC-language version of the operating program, and a copy of the interpreter program, are stored in the microcomputer 42. During each cycle of operation of the microcomputer (described in more detail below with reference to FIG. 2), the BASIC-language version of the program is converted to an object code version thereof, prior to employment of the object code version in the process of the present invention. Although this storage of the high-level language version of the program and its repeated conversion into object code within the microprocessor theoretically represents a considerable waste of computing power, this theoretical waste is of no practical importance since a reasonably powerful microcomputer, such as the preferred RCA Type S600 microcomputer, can run the relatively simple operating program required by the process of the present invention in several seconds, whereas in practice, it will not normally be necessary to run the operating program more than once every two minutes. Consequently, in practice there is ample time left to run the conversion of the BASIC-language version of the program into object code in the intervals during which the microcomputer 42 would otherwise be idle.

This storage of the BASIC-language version of the operating program and its repeated conversion to an object code conversion is performed in order that the apparatus of the invention can be rapidly and easily converted for use with differing compressors. A programmer with little training can easily change the compressor constants in a BASIC-language version of the program. However, changing compressor constants in an object code version of the operating program is a much more complicated procedure which cannot be achieved using relatively unskilled programmers. Consequently, we prefer to place a BASIC-language version of the operating program in the programmable read-only memory of the microcomputer 42 in order that relatively unskilled personnel can quickly and easily adapt the program for use with compressors having different compressor constants.

As shown in FIG. 1, power for the operation of the microcomputer 42 and other components for the apparatus of the invention is provided with a solar cell array 52, the output from which is first via a voltage regulator 54 to a 12 V rechargeable battery 56. Power is supplied from the rechargeable battery 56 via a voltage converter 58 to the microcomputer 42. Sources of power other than the solar cell array 52 could be used but solar energy is preferred. Wind power could be used to generate power, either alone or in combination with the solar cell. Other power sources as are available could be combined as needed.

The use of the solar cell array or photovoltaic power source 52 enables the apparatus of the present invention shown in FIG. 1 to operate completely independently of any external power sources. This is a marked advantage of the apparatus, since compressor sets are frequently used at remote locations where no source of electrical power is available. Consequently, in many cases the amount of wiring which would be required to connect an apparatus to a source of electrical power would render the use of the apparatus at the remote side impracticable. However, in view of the relatively high cost:power output of present day solar cell arrays, together with the bulk of such arrays, renders it imperative that a solar-powered apparatus of the present invention have a low power consumption. To keep the power consumption of the apparatus as low as possible, the microcomputer 42 chosen uses complementary metal oxide semiconductor logic, and all the other electronic logic components of the apparatus also use CMOS. Power consumption is further reduced by placing the operation of the pressure sensors 30 and 32 under the control of the microcomputer 42 (by means of electrical connection not shown) so that power is only supplied to the pressure sensors for part of each operating cycle of the apparatus. Naturally, when the pressure sensors are only powered for part of each operating cycle, appropriate controls must be included in the software to ensure that the conversion of the signals of the pressure sensors by the converter 38 is achieved while the pressure 30 and 32 are properly powered and are thus giving accurate readings.

The apparatus of the present invention shown in FIG. 1 further comprises a function switch 60, which is manually operable and by means of which an operator can cause the microcomputer 42 to calculate and display a plurality of parameters of the compressor. Finally, the apparatus comprises a six-digit decimal liquid crystal display 62 used for displaying the parameters selected by the operator.

Figure 2:
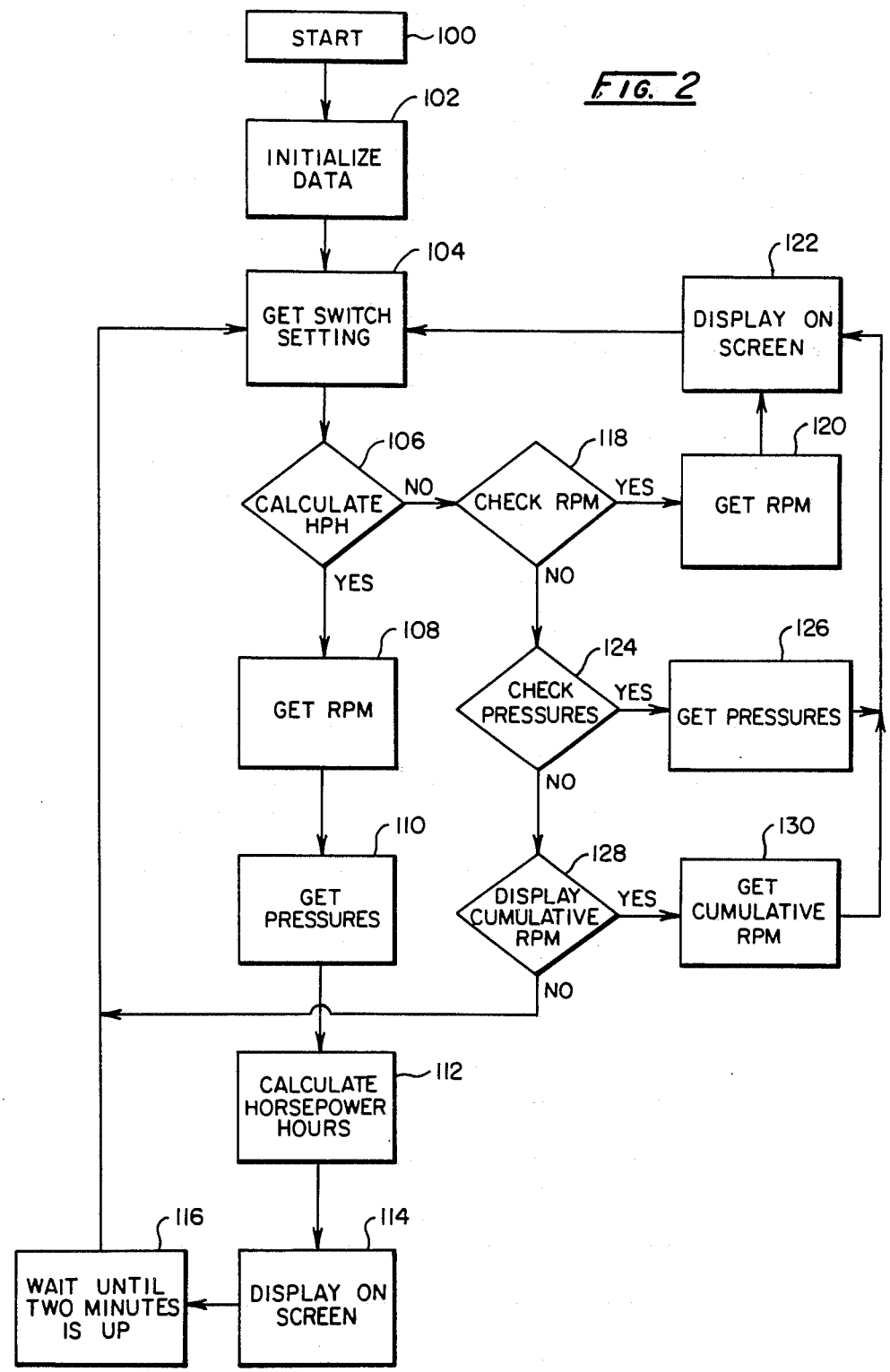
FIG. 2 is a flow diagram of the software used in the apparatus of the invention shown in FIG. 1.

The operating program used by the microcomputer 42 is shown schematically in FIG. 2. As shown in that figure, the program proceeds from a start BLOCK 100 to an initialization BLOCK 102 where the various data registers involved in the calculations are initialized in a manner which will be familiar to those skilled in the art. Next, at BLOCK 104, the microcomputer 42 reads the setting of the function switch in order to determine which parameters are required to be displayed. Having read the switch setting at BLOCK 104, the program then determines, at BLOCK 106, whether display of the total horsepower-hours of work performed by the compressor is to be displayed. If so, the program proceeds to read the number of revolutions effected by the compressor from the counter 48, at BLOCK 108, to read the suction and discharge pressures from the converter 38 at BLOCK 110, and then, at BLOCK 112 calculate the total horsepower hours, and outputs this value to the display 62 at BLOCK 114. Finally, the program waits at BLOCK 116 until two minutes have elapsed since the execution of BLOCK 104, and then recycles back to BLOCK 104.

If at BLOCK 106 the program determines that horsepower-hours is not the design parameter, it proceeds to BLOCK 118 and checks whether compressor speed is the desired parameter. If so, compressor speed is read from the counter 48 at BLOCK 120 and then, at BLOCK 122, displayed on the display 62. From BLOCK 122, the program recycles back to BLOCK 104. Note that, although BLOCK 122 corresponds in function to BLOCK 114, there is no delay BLOCK between BLOCK 122 and 104 corresponding to BLOCK 116. This omission is deliberate; normally the setting of the switch 60 is for horsepower-hours when the apparatus of the present invention is not being attended, and under these circumstances, the horsepower hours are only calculated every two minutes. (The BLOCK 112 includes both the calculation of horsepower hours elapsed since the last cycle and the addition of that value to the previous horsepower-hour total, so that it is the cumulative horsepower hour total which is displayed at 114.) In contrast, the remaining options for the switch 60 are intended to enable an operator inspecting the apparatus to perform a rapid reading of each of the parameters other than horsepower-hours, so that there is no need to build a delay between BLOCKS 122 and 104 corresponding to the delay 116 between BLOCK 114 and BLOCK 104.

If at BLOCK 118 the program determines that compressor revolutions is not the desired parameter, it proceeds, at BLOCK 124, to determine whether a reading of the suction and discharge pressures is required. If so, the suction and discharge pressures are read from the converter 38 and BLOCK 126, whence the program proceeds via the BLOCK 122 to display the pressures of the display 62, and then recycles back to BLOCK 104.

If at BLOCK 124 it is determined that a pressure check is not required, the program proceeds, at BLOCK 128, to determine whether cumulative compressor revolutions is the parameter desired. If not, there has been an error in reading the switch setting, and consequently the program immediately recycles back to BLOCK 104. If, however, at BLOCK 128 it is determined that cumulative compressor revolutions is the desired parameter, the cumulative compressor revolutions are read, at BLOCK 130, from a cumulative compressor revolutions register maintained within the microcomputer 42, and then the program proceeds via BLOCK 122, where the cumulative compressor revolutions are displayed on the display 62, and then recycles back to BLOCK 104.

The actual calculations required at BLOCK 112 in the above program to calculate horsepower-hours are the same as those already used by those skilled in the art of compressor technology to calculate the instantaneous power output of a compressor. It is well known to those skilled in the art that the brake horsepower output of a compressor compressing natural gas can be calculated by the equation:

$$BHP = (.0109\ P_D P_S (Z_S + Z_D)) \frac{\left[.97C1\left(\frac{Z_S}{Z_D}\right)(R_C^{.7937} - 1)\right]}{Z_S EC} (R_C^{.2063} - 1)$$

Where:
$P_S$ = suction pressure $P_D$ = discharge pressure
$Z_S$ = suction supercompressibility = $(1 - 0.00015 P_S)$
$Z_D$ = discharge supercompressibility = $(1 - 0.00015 P_D)$
C1 = piston clearance (decimal)
$R_C = P_D/P_S$ = compression ratio
$E_C$ = compressor efficiency (decimal)
$P_D$ = piston displacement = (cylinder area) × (stroke) × (RPM) ÷ 1728

At BLOCK 112 in the above program, the readings of suction and discharge pressures, and the compressor revolutions performed since the previous calculation, are used to calculate the horsepower-hours effected by the pressure during the previous two-minute interval. This value is then added to a total horsepower-hour register within microcomputer 42. For accuracy, a quartz crystal clock is used for timing control.

The apparatus shown in the accompanying drawings can be made compact and easily portable. In addition to the single-board RCA Type S600 microcomputer, a second printed circuit card contains the four-channel A/D converter 38, the revolution counter 48, the voltage regulator 54 and the voltge converter 58. A third printed circuit board mounted behind the display 62 contains the display drivers and signal condition circuitry for the function switch 60. The only external controls required are the function switch 60 and a power switch that also serves to reset the system. All components of the apparatus except for the pressure sensors, solar cell array and the magnetic pickup can be housed in a single housing approximately 30×25×20 cm. Because the only connections required to the compressor are the two pressure sensors and the magnetic pickup to sense crankshaft rotation, the device is easily installed on all reciprocating-type compressors. The low power consumption of the apparatus means that it can be built to be intrinsically safe. Although primarily designed for use on remotely located compressor sets such as those in natural gas production and storage service, it can be installed on compressors of all types, including, for example, air and refrigeration compressors.

It will be apparent to those skilled in the art that numerous changes and modifications can be made to the preferred embodiment of the invention described above without departing from the scope of the invention. For example, although we prefer to use a two minute cycle time for calculation of horsepower-hours developed by the compressor this cycle time can be varied quite widely, and may need to be adjusted depending upon how quickly the suction and discharge pressures of the compressor vary with time; obviously, if the suction and discharge pressures fluctuate to a significant interval within a given cycle, an instantaneous reading of the suction and discharge pressures, together with total compressor revolutions over the entire cycle, will not give an accurate measurement of the total horsepower-hours developed. Although we have found two minutes a convenient cycle time, the cycle time may vary, for example over the range of about thirty seconds to about ten minutes.

The power consumption of the device will vary with the exact electrical components included and with the length of time for which the pressure sensors are powered up during each cycle. To avoid an excessively large solar cell array, it is desirable to keep the power consumption of the apparatus, averaged over the complete cycle below about one Watt. It has been found that, constructing the apparatus from commercially available components and powering up the pressure sensors for only ten seconds out of each two-minute cycle enables the power consumption, averaged over the cycle, to be held down to aout 250 mW; the ten second powering interval for the pressure sensors is more than sufficient to deliver accurate pressure readings therefrom.

It will be apparent to those skilled in the art that further variations in the apparatus and process of the invention can be made. For example, although the apparatus described above is intended to allow read-out of the horsepower-hours by an operator visiting the site at which the apparatus is installed, the apparatus may, if desired, be provided with a transmitter, for example a radio or telephone transmitter, to enable its readings to be sent to a central recording location either at fixed intervals or when an appropriate interrogation signal is received from the central location. Where such facilities for transmission of results to a remote location are provided, the apparatus may also be modified to incorporate an alarm circuit which will transmit an alarm signal if the horsepower-hours developed by the compressor suddenly decline, thereby indicating a possible fault in compressor operation. The apparatus may be modified for use in multi-stage compressors by providing separate pressure sensors for reading the suction and discharge pressures of each stage; indeed, one of the reasons for providing a four-channel analog to digital converter 38 in the specific apparatus disclosed above is to make the apparatus readily usable with two-stage compressors.

In view of the various possible changes and modifications in the preferred embodiment of the invention described above, the whole of the foregoing description is to be construed in an illustrative and not in a limitative sense, the scope of the invention being defined solely by the appended claims.

We claim:

1. Apparatus for measuring the work performed by a gas compressor, said apparatus comprising:
    said apparatus being operatively connected to an engine by a rotable component, said engine being powered by the same gas being compressed by the compressor,
    a first pressure sensor means for measuring the suction pressure of gas entering said compressor and generating a first signal representative of said suction pressure;
    a second pressure sensor means for measuring the discharge pressure of gas leaving said compressor and generating a second signal representative of said discharge pressure;
    means for generating a third signal representative of the speed of rotation of the rotable component of the compressor connected to said engine during a predetermined time interval;
    a calculating means arranged to receive said first, second and third signals and to calculate therefrom a fourth signal representative of the work performed by said compressor during said predetermined time interval;
    a photovoltaic power source capable of generating electrical energy upon exposure to light; means for connecting the power source to a power supply means for supplying said electrical energy to said first and second pressure sensor means and to said calculating means; and means for controlling the supply of power to the first and second pressure sensor means, said power control means being arranged to supply power to said first and second pressure sensor means for only a powered portion of each predetermined time interval and to leave said first and second pressure sensor means unpowered for the remainder of each predetermined time interval, said calculating means being arranged to read the values of said first and second signals only during the powered portion of each predetermined time interval.

2. An apparatus according to claim 1 wherein said first and second pressure sensor means generate said first and second signals in analog form, said apparatus further comprising analog/digital conversion means arranged to receive said analog forms of said first and second signals and to generate digital forms of said first and second signals.

3. An apparatus according to claim 1 wherein said calculating means is arranged to sum said fourth signals generated during at least two of said predetermined time intervals, thereby producing a value representative of the total work perfomed by said compressor over a period comprising at least two of said predetermined time intervals.

4. An apparatus according to claim 3 further comprising visual display means arranged to display in humanly perceptible form at least one of the values of said fourth signal and said at least one value being representative of the total work performed.

5. An apparatus according to claim 1 wherein said calculating means comprises a first read-only memory containing at least a first program for calculating said fourth signal from said first, second and third signals, said program being written in a first language; a second read-only memory containing a second, interpreter program for converting said first language into a second language; and a central processing unit arranged to convert said first program from said first language to said second language using said second program, and thereafter to use the second-language form of said first program to calculate said fourth signal from said first, second and third signals.

6. An apparatus according to claim 1 having an average power consumption, over said predetermined time interval of not more than about one Watt.

* * * * *